United States Patent Office 3,546,022
Patented Dec. 8, 1970

3,546,022
VOLTAIC CELLS
Daryle H. Busch, Columbus, Ohio, and Wade H. Jordan, Jr., New Castle, Del., assignors to E. I. du Pont de Nemours and Company, Wilmington, Del., a corporation of Delaware
No Drawing. Filed July 15, 1968, Ser. No. 744,689
Int. Cl. H01m 17/00
U.S. Cl. 136—100     7 Claims

ABSTRACT OF THE DISCLOSURE

A primary voltaic cell including a sodium anode, an alkali metal hexafluorophosphate-polyether electrolyte having a specific conductance of at least 0.001 ohm$^{-1}$/cm.$^{-1}$ and an elemental sulfur cathode in electrical contact with an inert conductive material.

SPECIFICATION

This invention relates to a primary voltaic cell, in particular to a cell comprising a sodium anode, an electrolyte consisting of an alkali metal hexafluorophosphate dissolved in a polyether and a cathode comprising elemental sulfur.

BACKGROUND

There is a growing interest in voltaic cells which utilize anodes of the light, highly electropositive metals of Groups I–A and II–A of the Periodic Table, i.e. the alkali and alkaline earth metals. The prior art has produced many cells utilizing such high energy density anode materials; few such cells are entirely satisfactory, however. One difficulty has been the lack of mutually compatible light metal anodes, electrolytes, and cathodes for preparing a long-lived high energy cell. Thus, the electrolyte must be non-reactive towards both anode and cathode. Such inertness is necessary to avoid depletion of active electrode materials and internal cell shorting, and, therefore, short use life and short shelf life. Permselective membranes have been employed to reduce such detrimental anode-electrolyte-cathode interaction by separation of cells into two half-cells. Of course, such membranes add to internal cell resistance and thereby limit such separated cells to lower drain applications than would be available in single compartment, i.e. unseparated cells having the same components and component disposition.

It is therefore an object of this invention to provide high energy voltaic cells with compatible electrode-electrolyte combinations. Another object is a single compartment cell with good stability against self-discharge when not in use and good discharge characteristic under load.

SUMMARY OF THE INVENTION

The sealed, single compartment volatic cell of the subject invention is comprised of:

(A) A sodium anode;
(B) As a normally liquid electrolyte, a solution of one or more alkali metal hexafluorophosphates in a polyether of the formula RO(R'O)$_n$R" wherein (1) $n$ is an integer of from 1 to about 4;
(2) R and R" are separately chosen from alkyl or cycloalkyl groups of from 1 to about 10 carbons;
(3) R' is —CH$_2$ or —CH$_2$CH$_2$—; and
(4) R, R' and R" taken together have at least 4 carbons when $n$ is 1;

the electrolyte having a specific conductance of at least about 0.001 ohm$^{-1}$/cm.$^{-1}$;
(C) An elemental sulfur cathode in electrical contact with an inert conductive material; and
(D) An external circuit electrically connecting the anode and cathode.

DETAILED DESCRIPTION OF INVENTION

Except in that the cells be operable, this invention is not concerned with cell form or cell construction. What is required for operability is that a sodium anode and a sulfur cathode be spaced apart, immersed in the polyether alkali metal hexafluorophosphate liquid electrolyte and that such electrodes be electrically in contact with conductors which conductors are, in turn, electrically connected to an external circuit in which circuit energy from the cell is utilized. It will be appreciated that it is highly desirable to isolate (seal) the highly reactive sodium in such cells from air-borne gases and moisture which react with and needlessly destroy sodium.

The ratio of sodium to sulfur in a cell is not critical to operability. A cell with only traces of sulfur (relative to anode sodium) in the cathode will produce voltage as long as the sulfur is in electrical contact with the external circuit. On the other hand, large quantities of sulfur, say 10 atoms or even more per atom of sodium also are operable, but unnecessary. A preferred ratio range, providing excellent sodium and sulfur utilization, is from about 1 atom of sulfur for two atoms of sodium to about 5 atoms of sulfur per atom of sodium.

The temperature range over which the cell is operated can vary widely. To maintain, respectively, anode integrity and practical internal cell resistance, one would usually operate such cells at below the fusion temperature of sodium. Since the lower polyethers have an atmospheric pressure boiling point below the fusion temperature of sodium, one would usually operate cells containing such polyethers at below the boiling temperature of such polyethers. On the other hand the cell container can be a pressurized container to prevent volatilization of such polyethers.

The sodium anode

Although sodium is a conductive metal and can serve as an operable anode by itself, sodium is structurally weak and atmosphere reactive, as mentioned above. Thus, practical, useful sodium anodes are so prepared that they may have sufficient strength to maintain their preselected position in a cell and that they may be isolated from ordinary atmospheric environment. For example, a suitable sodium anode may be prepared by pressing sodium metal into the mesh of a conductive screen, e.g., a metal screen from which screen a previously connected or later attached wire leads to the external circuit from the air and moisture-free environment of the anode. Similarly sodium may be adhered by fusion or by mechanical pressure to a rigid, conductive plate, e.g., a metal plate. Inasmuch as such a plate can be a barrier to air and moisture or other sodium reactive agents, it can serve as an external conductor. That is, the side of the plate away from the sodium may be an external electrically contactable cell surface. Further such plate may be connected to a lead to serve as a conductor base as in the case of the screen-base anode above. Other means of effectively utilizing sodium as an anode will be obvious to those skilled in the art.

The electrolyte

By electrolyte is meant the combination of a polyether solvent and an alkali metal hexafluorophosphate.

Polyethers

Suitable polyethers are represented by the formula RO(R'O)$_n$R" where $n$ is an integer of from 1 to about 4, R and R" are alkyl (or cycloalkyl) groups of 1 to about 10 carbons such as methyl, ethyl, propyl, butyl, cyclohexyl and the like and R' is ether —CH$_2$— or —CH$_2$CH$_2$—, i.e., the diradicals, respectively, of methane and ethane. Suitable polyethers for this invention are (a) Unreactive towards and non-solvents for the sodium of the anode, the elemental sulfur of the cathode and other cell materials, i.e., except for the alkali metal hexafluorophosphate conductive salts, (b) Solvents for, but non-reactive towards, the alkali metal hexafluorophosphates, such that the hexafluorophosphate-polyether solution has a specific conductance of at least 0.001 ohm$^{-1}$/cm.$^{-1}$. Solutions with lower specific conductances afford operable cells, but cells with such high internal resistance are, like membrane divided cells, suitable only for low drain, i.e., low amperage applications, (c) Substantially inert during cell operation, i.e., do not take part in oxidations and reductions while the cell is being used.

A preferred polyether which is particularly well balanced in the above qualities is the dimethyl ether of diethylene glycol, CH$_3$OCH$_2$CH$_2$OCH$_2$CH$_2$OCH$_3$. Other suitable polyethers are ethylene glycol diethers such as the dimethyl-, diethyl-, methylethyl-, dipropyl-, dibutyl-, dicyclohexyl-, methylcyclohexyl ethers and the like. Still other polyethers are the dialkyl or dicycloalkyl ethers of dimethylene glycol, trimethylene glycol and the like, wherein the alkyl groups have from 1 to about 10 carbon atoms, and the cycloalkyl groups from 3 to about 10 carbon atoms.

It is preferable that the polyether be substantially anhydrous, i.e., contain less than about 100 p.p.m. by weight of water, most preferably less than about 10 p.p.m

Alkali metal hexafluorophosphates

Suitable metal hexafluorophosphates are of group IA metals; preferred are those of lithium, sodium and potassium and combinations thereof. As an example of the above mentioned criterion of electrolyte suitability, a room temperature saturated solution of potassium hexafluorophosphate in the dimethylether of diethylene glycol has a specific conductance of about 0.005 ohm$^{-1}$/cm.$^{-1}$.

Electrolyte preparation

Lithium, sodium and potassium hexafluorophosphates often may be used as received from commercial suppliers. It is preferred that a practical dryness (i.e., no more than about 0.5% water by weight) in such salts be assured by heating them to about 100 to about 110° C. for at least 48 hours. Storage of these salts under an inert, dry atmosphere of argon or nitrogen before use is preferred.

Some purification of the polyethers is usually needed to remove electrode reactive species. For example, such polyethers, even when freshly distilled, still contain sufficient quantities of peroxides, alcoholic —OH groups and water that substantial, sodium destroying reactions are possible. Although not all the impurities need be removed, polyethers are preferably purified for this invention as follows. The polyether is distilled under an argon or nitrogen atmosphere from an excess of finely divided lithium aluminum hydride. Up to about 20% by weight of the initial distillate portions are discarded or recycled, while the remaining center distillate is maintained for use. Adequate purity of this center cut is maintained by storage under an inert gas atmosphere, e.g., argon or nitrogen, over particulate sodium.

It will be appreciated that the distillation of such polyethers from lithium aluminum hydride can be hazardous especially at higher distillation temperatures. Thus, it is highly desirable to conduct the distillation of the higher boiling polyethers at reduced pressures. For example, the distillation of the dimethyl ether of diethylene glycol may be conducted at between about 5 and 50 mm. of mercury absolute pressure.

To form the electrolyte, the desired quantity of the hexafluorophosphate is dissolved in the treated polyether. The quantity of hexafluorophosphate dissolved may vary widely depending both on solubility and on desired solution characteristics, e.g., a solution having a high degree of mobility, i.e., low viscosity and/or maximum conductance. With the dimethyl ether of diethylene glycol and potassium hexafluorophosphate a solution saturated at room temperature affords a very desirable electrolyte. Once prepared, the electrolyte may be used in a cell immediately. It is preferred, however, that before use the liquid electrolyte be agitated with and stored over particulate sodium under an inert gas atmosphere.

Several hours of such treatment aids in removal of any electrode reactive materials which may have entered the electrolyte during handling.

While it is preferred that the electrolyte, after the above treatment, contains less than about 0.1% by weight of water to avoid needless waste of sodium, it is to be understood that the only theoretical upper limit on water in a cell is 1 molecule of water per 1 atom of sodium.

The cathode

Elemental sulfur per se is non-conductive and must therefore, be in electrical contact with a conductor to form a practical cathode for the cells of this invention. The sulfur may be intimately mixed or fused with a conductive material such as particulate carbon, finely ground stainless steel or platinum or other non-reactive conductor. Conductive particulate carbon such as, for example, lamp black or acetylene black is a suitably conductive material of relatively low cost. Further such carbon blacks are technically meritorious because of their high surface area, light weight and inertness in the cells of this invention.

As is the case of the anode the sulfur-carbon cathode has to be in electrical contact with an external circuit. Thus, the sulfur-carbon mixture may be compacted by pressure, or by fusion of the sulfur with heat, against a carbon or metal plate or rod which plate or rod is itself the external contact to the external circuit or connected to such external contact. The sulfur carbon mixture may also be fused onto or pressed onto a metal screen. Alternatively, sulfur may be diffused into a rigid, porous carbon structure which furnishes, in a single unit, intimate sulfur-carbon contact, conductor and external contact. Diffusion of the sulfur into the porous carbon structure may be accomplished by allowing the structure to stand in molten sulfur. The sulfur-carbon mixture may also be in the form of a sheet structure bound by incorporation therein of a solidifiable resin. Further, the sulfur-carbon mixture may be made into a paste with the electrolyte and used as a paste retained by suitable means in contact with a conductive plate, screen, rod or the like.

The ratio of sulfur to carbon may vary widely. For example, a porous carbon rod cathode is operable with as little as 1% by weight of sulfur, relative to rod weight, diffused into the rod. On the other hand, a pressed cathode comprising 90% by weight sulfur and 10% carbon black fused against a copper plate is also suitable.

The following examples more fully illustrate the cells of this invention, but are not intended to be in limitation thereof.

EXAMPLE 1

In the following experiment a substantially moisture-free and air free glove box is utilized for cell assembly and for cell testing. During the assembly and the testing a positive differential pressure, of about 6 cm. of water, of dry nitrogen is maintained in the box. The dry nitrogen is allowed to flow into the box at a rate sufficient to provide about 1 box volume of nitrogen per day. Non-reactivity of the nitrogen with sodium is further assured by circulating the box atmosphere through a column of particulate sodium.

The electrolyte is prepared from a center cut of the dimethyl ether of diethylene glycol freshly distilled from excess lithium aluminum hydride at 20 mm. Hg absolute pressure. The dimethyl ether of diethylene glycol so distilled is saturated with potassium hexafluorophosphate by warming and agitating an excess of the hexafluorophosphate in the dimethyl ether of diethylene glycol at 35 to 40° C. and allowing the solution to cool to room temperature. The saturated solution is decanted from the excess hexafluorophosphate and stored in a dry nitrogen atmosphere over approximately 10 parts of sodium sand (5 to 50µ particles) per 100 parts of electrolyte by weight.

The cathode is performed in the cell body, a flat bottomed, straight sided glass beaker 2.5 cm. in diameter and 3.7 cm. long. First the end of a copper metal mesh, 2 cm. wide and 7.5 cm. long, is unraveled for 2.5 cm. and the unraveled end is arranged flat against the beaker bottom. The rest of the mesh is bent to extend upward out of the beaker. Next an intimate mixture of 1.2 g. of sublimed sulfur powder and 0.8 g. of acetylene black powder is added to the beaker. The beaker bottom is heated until the cathode mass becomes plastic. The mass is compressed evenly around screen end and into the bottom of the beaker by manual pressure on a close-fitting polyethylene rod. Upon cooling to room temperature the mass hardens around the unraveled end of the screen. A nylon spacer, comprising a disk of mesh 2.5 cm. in diameter, 0.05 mm. thick and having 50% open space, is next placed flat against the cathode surface. The completed cell body-cathode assembly is placed in the operating glove box for several hours before use.

The sodium anode is prepared in the glove-box by pressing one end of a 7.5 x 2 cm. copper metal mesh into a 1 g. disk, 1 cm. in diameter, of freshly cut sodium until the mesh is embedded in the sodium and the disk of sodium has been spread out to a 2 cm. diameter. The remaining mesh is bent at a right angle to the sodium disk.

Final cell assembly comprises placing the anode assembly into the beaker against the nylon spacer and adding sufficient electrolyte to cover both electrodes. Electrical connection is provided by clamping leads to each of the pieces of upward extending copper mesh. Wire leads from each clamp exit the glove-box through sealed, electrically insulated openings in the box. When the leads external to the box are connected to a high-resistance ($10^{14}$ ohms) volt meter, an open circuit reading of 3.2 volts is obtained. When the external leads are connected across a 500 ohms resistor, voltage drops in a few minutes to 2.5 volts and then slowly to 1.5 volts 24 hours later, when the test is terminated.

EXAMPLES 2 AND 3 AND COMPARATIVE EXAMPLES A, B AND C

In the following examples, cells were prepared as in Example 1 except that different electrolytes are used. The sodium hexafluorophosphate and the lithium hexafluorophosphate were prepared and stored over sodium sand as in Example 1. The acetic anhydride and tri-n-propylamine electrolyte were prepared as in Example 1 except that the solvents were distilled, treated with sodium sand and stored until use over fresh sodium sand. The cell performances are compared in Table 1.

Data in Table 1 indicate that lithium and sodium hexafluorophosphate are comparable to potassium hexafluorophosate in effectiveness as electrolyte salts. The data further illustrates the superiority of the polyether electrolyte solvents.

TABLE 1

| Example | Electrolyte | Open circuit voltage | Cell performance under 500 ohms load | | |
|---|---|---|---|---|---|
| | | | Initial volts | Final volts | Hours under load |
| 2 | $NaPF_6$ saturated solution in the dimethyl ether of diethylene glycol. | 3.0 | 2.2 | 1.5 | 24 |
| 3 | $LiPF_6$ saturated solution in the dimethyl ether of diethylene glycol. | 3.2, | 2.2, | 1.5, | 24 |
| Comparative A | $KPF_6$ saturated acetic anhydride | 2.2 | <1.0 | 0.2 | 1 |
| Comparative B | $NaPF_6$ saturated acetic anhydride | 2.9 | 2.2 | 0.5 | 10 |
| Comparative C | $KPF_6$ saturated tri-n-propylamine | *0 | 0 | 0 | |

*Cell had an essentially infinite internal resistance.

The following example illustrates the long shelf life, i.e. storage life of such cells when out of service.

EXAMPLE 4

The cell in this example is prepared in a sealed polyethylene jar, internally about 2.5 cm. in diameter and about 3.7 cm. long. The sealed jar assembly permits removing the cell from the glove-box for exposure to ordinary atmospheric conditions.

The cathode assembly was prepared using a copper disk 2 mm. thick and about 2 cm. in diameter. To the center of one side of the disk a flathead brass bolt is silver soldered, head-to-disk. On the side away from the bolt a cathode disk is fused to the copper disk.

A cathode mixture, of 80 wt. percent sulfur and 20 wt. percent acetylene black, is fused to the copper disk by heating the disk to 120–125° C. and die pressing the cathode mixture to the heated copper disk using a manual pressure die comprising a brass rod about 20 cm. long and 2 cm. in diameter and a glass sleeve retainer of 2 cm. internal diameter. Upon cooling to room temperature, there results a flat, solid disk of compressed cathode mass about 2 cm. in diameter and 3 mm. thick. A hole large enough to pass the bolt is drilled in the center of the polyethylene screw cap of the jar. The bolt on the copper disk-cathode mixture is forced through the hole until the copper disk is flush against the inside top of the jar cap with the cathode disk facing inward. A small soldering gun is used to heat-seal the polyethylene around the bolt on the external part of the jar cap. A nut tightened on the exiting bolt further improves the seal. The whole cap-cathode apparatus is stored in the operating glove box until use. A piece of silver screen with 0.5 mm. openings and 2.5 cm. in diameter is silver soldered to a brass bolt as was the copper plate. This bolt is forced through a hole in the jar bottom so that the screen conforms to the inside of the jar bottom. The polyethylene around the exit point of the screw is heat-sealed to the bolt. A nut is tightened on the bolt against the external jar bottom. In the operating glove-box, molten sodium is poured into the jar over the silver screen to a depth of about 3 mm. Upon cooling to room temperature the jar is filled with electrolyte of essentially the same composition as in Example 1. The polyethylene cap-cathode assembly is screwed tightly onto the jar and the resulting cell removed from the glove-box and stored on its side.

Upon shorting the two bolt electrode contacts through a milliammeter for 1/10 to 1/5 second, the fresh cell delivers a short-circuit current of 25 ma. When the screws are, in turn, connected to a volt meter of $10^{14}$ ohms internal resistance an open circuit voltage of 2.5 is obtained. After 24 hours disconnected storage the open circuit voltage is 2.5 and the short-circuit current 20 ma. After 64 days of shelf storage the cell still delivers a 17 ma. short circuit current and 2.3 volts open circuit voltage.

When the cell is disassembled the electrodes are visually intact; i.e., show no evidence of chemical or electro-chemical attack.

The excellent coulombic efficiency in sodium-sulfur cells is demonstrated in the next example.

EXAMPLE 5

In this example the cell is prepared and tested in the glove-box with the nitrogen flow turned on.

The cathode is prepared by grinding an intimately mixing 40 g. of sublimed sulfur powder 10 g. of acetylene black powder and 5 g. of powdered potassium hexafluorophosphate. The mixture is moistened with enough sodium-dried dimethyl ether of diethylene glycol so that it can be easily packed manually into a porous paper, round bottomed thimble 2.5 cm. in diameter and 8 cm. long. The mixture is packed into the thimble around a rigid, conductive carbon rod 10 cm. long and 8 mm. in diameter.

A sodium anode is prepared by repeatedly dipping one end of a 7.5 x 2 cm. piece of copper screen with about 1 mm. openings into molten sodium. After the sodium cools, about 2 cm. of the end of the screen is covered with 0.240 g. of bright sodium. The cathode thimble and the anode are arranged side by side and about 0.5 mm. apart in a 50 ml. glass laboratory beaker. A solution of 40 ml. of the dimethyl ether of diethylene glycol and 8 g. of potassium hexafluorophosphate is added to the beaker to cover the anode and the cathode paste in the thimble. Leads exiting the box, as in Example 1, are clamped to the carbon rod and the copper screen and the cell is discharged through a 100 ohms load. Initial open circuit voltage is 2.5 volts and, under the 100 ohms load, the cell initially produces 2.1 volts. After 68 hours voltags has dropped to 0.04 volt and the experiment is terminated. In that time period the cell delivers 154.4 ma.-hours corresponding to 55.2 mole percent of the sodium originally on the anode.

The foregoing detailed description has been given for clearness of understanding only and no unnecessary limitations are to be understood therefrom. The invention is not limited to the exact details shown and described, for obvious modifications will occur to those skilled in the art.

What is claimed is:
1. A sealed, single compartment voltaic cell comprising:
(A) a sodium anode;
(B) as a normally liquid electrolyte having a specific conductance of at least 0.001 ohm$^{-1}$/cm.$^{-1}$, a solution of alkali metal hexafluorophosphate in a dialkyl ether of alkylene glycol where the alkyl contains 1 to 4 carbon atoms and the alkylene is selected from the group consisting of diethylene, ethylene, dimethylene, and trimethylene;
(C) an elemental sulfur cathode in electrical contact with an inert conductive material; and
(D) an external circuit electrically connecting the electrodes.

2. Claim 1 wherein said ether is the dimethyl ether of diethylene glycol.

3. Claim 2 wherein said hexafluorophosphate is potassium hexafluorophosphate.

4. Claim 2 wherein said hexafluorophosphate is sodium hexafluorophosphate.

5. Claim 2 wherein said hexafluorophosphate is lithium hexafluorophosphate.

6. Claim 2 wherein said conductive material is conductive carbon.

7. Claim 2 wherein wherein said cell contains less than about 0.1% by weight of water.

References Cited

UNITED STATES PATENTS

| 3,043,896 | 7/1962 | Herbert et al. | 136—6 |
|---|---|---|---|
| 3,073,884 | 1/1963 | Pinkerton | 136—155 |
| 3,279,952 | 10/1966 | Minnick | 136—83 |
| 3,393,093 | 7/1968 | Shaw et al. | 136—6 |
| 3,413,154 | 11/1968 | Rao | 136—83 |

WINSTON A. DOUGLAS, Primary Examiner

C. F. LE FEVOUR, Assistant Examiner

U.S. Cl. X.R.
136—120, 155